(12) United States Patent
Yang et al.

(10) Patent No.: US 10,332,056 B2
(45) Date of Patent: Jun. 25, 2019

(54) FEATURES SELECTION AND PATTERN MINING FOR KQI PREDICTION AND CAUSE ANALYSIS

(71) Applicant: Futurewei Technologies, Inc., Plano, TX (US)

(72) Inventors: Kai Yang, Bridgewater, NJ (US); Yanjia Sun, Downingtown, PA (US); Ruilin Liu, Hillsborough, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 410 days.

(21) Appl. No.: 15/069,617

(22) Filed: Mar. 14, 2016

(65) Prior Publication Data

US 2017/0262781 A1    Sep. 14, 2017

(51) Int. Cl.
*G06Q 10/00* (2012.01)
*G06Q 10/06* (2012.01)

(52) U.S. Cl.
CPC . *G06Q 10/06393* (2013.01); *G06Q 10/06395* (2013.01)

(58) Field of Classification Search
CPC ............................................ G06Q 10/00–50/00
USPC ................................................ 705/7.11–7.42
See application file for complete search history.

(56) References Cited

U.S. PATENT DOCUMENTS

| | | | |
|---|---|---|---|
| 6,278,997 B1 * | 8/2001 | Agrawal | G06F 16/2465 |
| 6,651,049 B1 * | 11/2003 | Agrawal | G06F 16/2465 |
| | | | 707/694 |
| 8,775,341 B1 | 7/2014 | Commons | |
| 9,152,918 B1 | 10/2015 | McNair | |
| 9,258,200 B2 * | 2/2016 | Wan | H04L 43/08 |
| 9,424,121 B2 * | 8/2016 | Kushnir | G06F 11/079 |
| 9,542,532 B1 * | 1/2017 | McNair | G06Q 50/24 |

(Continued)

FOREIGN PATENT DOCUMENTS

| | | |
|---|---|---|
| CN | 101189895 A | 5/2008 |
| CN | 101527895 A | 9/2009 |

(Continued)

OTHER PUBLICATIONS

Batteram, Harold, et al. "Delivering quality of experience in multimedia networks." Bell Labs Technical Journal 15.1 2010): 175-193. (Year: 2010).*

(Continued)

*Primary Examiner* — Alan S Miller
(74) *Attorney, Agent, or Firm* — Vierra Magen Marcus LLP

(57) ABSTRACT

The disclosure relates to technology for processing data sets to generate data rules for the data sets in a communications network. A first set of data including key quality indicators (KQIs) indicative of a quality of service and a second set of data including key performance indicators (KPIs) indicative of a performance level are received. The first data set and the second data set are categorized using a first value into a plurality of KQI groups and a second value into a plurality of KPI groups, respectively. Each of the KQI and KPI groups are identified with a label. Each of the KQI and KPI groups identified with a same label are processed by application of association rule learning to generate the data rules. The data rules model a relationship between the KQIs and the KPIs by calculating association frequencies.

27 Claims, 10 Drawing Sheets

(56) References Cited

U.S. PATENT DOCUMENTS

| | | | |
|---|---|---|---|
| 2002/0022952 A1 | 2/2002 | Zager et al. | |
| 2003/0130991 A1* | 7/2003 | Reijerse | G06F 19/18 |
| 2007/0263539 A1* | 11/2007 | Lonnqvist | H04L 41/5009 370/232 |
| 2009/0024551 A1* | 1/2009 | Agrawal | G06N 5/02 706/47 |
| 2009/0052330 A1 | 2/2009 | Matsunaga et al. | |
| 2009/0165078 A1* | 6/2009 | Samudrala | G06F 21/604 726/1 |
| 2009/0192867 A1* | 7/2009 | Farooq | G06Q 10/06 705/7.29 |
| 2013/0272150 A1 | 10/2013 | Wan et al. | |
| 2015/0049634 A1 | 2/2015 | Levchuk et al. | |
| 2015/0074035 A1 | 3/2015 | Narasappa | |
| 2015/0134622 A1 | 5/2015 | Ebel et al. | |
| 2016/0105801 A1 | 4/2016 | Wittenberg et al. | |
| 2016/0162346 A1* | 6/2016 | Kushnir | G06F 11/079 714/37 |
| 2016/0292611 A1 | 10/2016 | Boe et al. | |
| 2016/0344606 A1* | 11/2016 | Baccarani | H04L 41/5067 |
| 2016/0350173 A1* | 12/2016 | Ahad | G06F 11/3495 |

FOREIGN PATENT DOCUMENTS

| | | |
|---|---|---|
| CN | 102143507 A | 8/2011 |
| CN | 103024793 A | 4/2013 |
| CN | 103812671 A | 5/2014 |
| CN | 105050125 A1 | 11/2015 |
| CN | 105099759 A | 11/2015 |
| EP | 2919416 B1 | 9/2015 |
| WO | 2016093836 A1 | 6/2016 |
| WO | 2017016492 A1 | 2/2017 |

OTHER PUBLICATIONS

Toube, Hideki, et al. "Problems and feasibility consideration of service-forcused monitoring OSS over mobile networks." Network Operations and Management Symposium (APNOMS), 2012 14th Asia-Pacific. IEEE, 2012. (Year: 2012).*
PCT/CN2017/075362, ISR, dated Jun. 2, 2017.
U.S. Appl. No. 15/186,346, filed Jun. 17, 2016.
U.S. Appl. No. 15/476,584, filed Mar. 31, 2017.
3GPP TS 32A50 V13.0.0 (Jan. 2016),3rd Generation Partnership Project;Technical Specification Group Services and System Aspects;Telecommunication management; Key Performance Indicators (KPI) for Evolved Universal Terrestrial Radio Access Network (E-UTRAN): Definitions(Release 13),total 17 pages.
PCT/CN2018/079421, ISR, dated Jun. 11, 2018, 9 pages.
Karatepe, Ilyas Alper, et al., "Anomaly Detection in Cellular Network Data Using Big Data Analysis," Proceedings of European Wireless Conference, May 2014, 5 pages.
Grinstead, Charles, et al., "Chapter 11—Markov Chains," Introduction to Probability, American Mathematical Society, Jul. 1997, 66 pages.
Combo, "Monitoring parameters relation to QoS/QoE and KPIs," Version V2.0, Jun. 2014, 50 pages.
The PAM Clustering Algorithm, [www.cs.umb.edu/cs738/pam1.pdf], Apr. 2010, 4 pages.
Soldani, Dr. David, "QoE and QoS Monitoring and data analyses," Powerpoint, Special Course on Networking Technology, Helsinki University of Technology, Nov. 2006, 56 pages.
Office Action dated Jan. 1, 2019, in U.S. Appl. No. 15/186,346.
Office Action dated Jan. 11, 2019, in U.S. Appl. No. 15/476,584.
English Abstract of CN102143507 dated Aug. 3, 2011.

* cited by examiner

KQI and KPI Categorization Table

| CellId | POSIXct | HTTP_Pa ge_Large _Display _Rate_kb ps | HTTP_Pa ge_CountBm | VS_MeanMeanTot RTWP_d aITcpUtili tyRatio | HSDPACa llDropRat io | VS_MeanMeanTot HSDPACa ULCECon gNum | ULPower m | DLPower CongNu m | CongNu gNum | HSDPARL CRetrans CodeCon mittedRa tio | HSDPARL CPackage Discarde dRatio | PoorCove rageRati o | VS.HSDP A.MeanC hThroug hput.Tot alBytes.b yte. | VS.RLC.A M.Tx.Hsd paTrf.PD U.packet.scp | BestCovePilotPoll BestCellR scp | BestCellE CNO | RanCong |
|---|---|---|---|---|---|---|---|---|---|---|---|---|---|---|---|---|---|
| 38168 | 5/31/2014 8:00 | 1 | 3 | 4 | 4 | 4 | 1 | 4 | 2 | 1 | 2 | 2 | 3 | 4 | 4 | 2 | 3 | 3 |
| 38168 | 5/31/2014 21:00 | 1 | 3 | 3 | 1 | 3 | 1 | 4 | 2 | 1 | 3 | 2 | 2 | 3 | 2 | 2 | 2 | 2 |
| 38168 | 5/31/2014 22:00 | 1 | 2 | 3 | 2 | 4 | 1 | 4 | 2 | 1 | 3 | 2 | 2 | 3 | 2 | 2 | 2 | 2 |
| 38168 | 6/1/2014 22:00 | 1 | 2 | 4 | 2 | 4 | 1 | 4 | 2 | 1 | 4 | 4 | 3 | 3 | 1 | 2 | 2 | 2 |
| 38168 | 6/2/2014 20:00 | 1 | 4 | 4 | 2 | 1 | 1 | 4 | 2 | 1 | 4 | 2 | 2 | 3 | 2 | 2 | 3 | 2 |
| 38168 | 6/2/2014 22:00 | 1 | 4 | 2 | 2 | 3 | 1 | 4 | 2 | 1 | 4 | 4 | 4 | 2 | 1 | 3 | 2 | 2 |

FIG. 9A

KQI Pattern Detection Table

| KPI | KQI | Support | Confidence | Lift | Top 5% KPI | Top 20% KQI |
|---|---|---|---|---|---|---|
| {MeanTotalTcpUtilityRatio=1} | {HTTP_Page_Response_Delay_s=1} | 4163 | 0.717882 | 3.672943 | 0.898 | 1.05 |
| {VS.CellDCHUEs=1} | {HTTP_Page_Response_Delay_s=1} | 3445 | 0.593761 | 3.037893 | 33.86642 | 1.05 |
| {RanCong=1} | {HTTP_Page_Response_Delay_s=1} | 3170 | 0.54778 | 2.802636 | 431 | 1.05 |
| {BestCellECNO=1} | {HTTP_Page_Response_Delay_s=1} | 2984 | 0.517876 | 2.649638 | -13.51 | 1.05 |
| {HSDPARLCPackageDiscardedRatio=1} | {HTTP_Page_Response_Delay_s=1} | 2311 | 0.39838 | 2.038253 | 0.000818 | 1.05 |
| {HSDPACallDropRatio=1} | {HTTP_Page_Response_Delay_s=1} | 2233 | 0.384934 | 1.969458 | 0.038576 | 1.05 |
| {VS_MeanRTWP_dBm=1} | {HTTP_Page_Response_Delay_s=1} | 2198 | 0.3789 | 1.938589 | -101.208 | 1.05 |
| {ULPowerCongNum=1} | {HTTP_Page_Response_Delay_s=1} | 2135 | 0.377142 | 1.929593 | 70 | 1.05 |
| {HSDPARLCRetransmittedRatio=1} | {HTTP_Page_Response_Delay_s=1} | 2117 | 0.364937 | 1.867149 | 0.010624 | 1.05 |
| {HTTP_Page_Count=1} | {HTTP_Page_Response_Delay_s=1} | 2027 | 0.349905 | 1.79024 | 765 | 1.05 |
| {VS.RLC.AM.Tx.HsdpaTrf.PDU.packet.=1} | {HTTP_Page_Response_Delay_s=1} | 1815 | 0.312823 | 1.600515 | 6099835 | 1.05 |
| {PilotPollutionRatio=1} | {HTTP_Page_Response_Delay_s=1} | 1760 | 0.305396 | 1.562518 | 0.3 | 1.05 |

FIG. 9B

KQI Pattern Detection Table

| KPI | KQI | Support | Confidence | Lift | Top 5% KPI | Top 20% KQI |
|---|---|---|---|---|---|---|
| {MeanTotalTcpUtilityRatio=1} | {HTTP_Page_Large_Display_Rate_kbps=1} | 3279 | 0.787653 | 3.937793 | 0.911488 | 118.09 |
| {BestCellECNO=1} | {HTTP_Page_Large_Display_Rate_kbps=1} | 2066 | 0.501213 | 2.505764 | -13.652 | 118.09 |
| {RanCong=1} | {HTTP_Page_Large_Display_Rate_kbps=1} | 1997 | 0.480279 | 2.401106 | 584 | 118.09 |
| {HSDPARLCPackageDiscardedRatio=1} | {HTTP_Page_Large_Display_Rate_kbps=1} | 1749 | 0.420231 | 2.100901 | 0.000852 | 118.09 |
| {HSDPACallDropRatio=1} | {HTTP_Page_Large_Display_Rate_kbps=1} | 1718 | 0.413478 | 2.06714 | 0.041379 | 118.09 |
| {VS.RLC.AM.Tx.HsdpaTrf.PDU.packet.=1} | {HTTP_Page_Large_Display_Rate_kbps=1} | 1646 | 0.395483 | 1.977177 | 6475555 | 118.09 |
| {ULPowerCongNum=1} | {HTTP_Page_Large_Display_Rate_kbps=1} | 1495 | 0.365794 | 1.82875 | 37 | 118.09 |
| {HSDPARLCRetransmittedRatio=1} | {HTTP_Page_Large_Display_Rate_kbps=1} | 1490 | 0.358001 | 1.78979 | 0.011113 | 118.09 |
| {VS.HSDPA.MeanChThroughput.TotalBytes.byte.=1} | {HTTP_Page_Large_Display_Rate_kbps=1} | 1487 | 0.35728 | 1.786186 | 8.94E+08 | 118.09 |
| {HTTP_Page_Count=1} | {HTTP_Page_Large_Display_Rate_kbps=1} | 1443 | 0.34813 | 1.740442 | 805 | 118.09 |
| {PilotPollutionRatio=1} | {HTTP_Page_Large_Display_Rate_kbps=1} | 1239 | 0.300509 | 1.502366 | 0.308837 | 118.09 |

FIG. 9C

FEATURES SELECTION AND PATTERN MINING FOR KQI PREDICTION AND CAUSE ANALYSIS

BACKGROUND

Service quality as perceived by customers is an important aspect of the telecommunications industry. To successfully maintain and enhance the service quality to customers, network behaviors require measurement and analysis. However, measuring and improving a customer's quality of service (QoS) experience remains a challenging task, which requires accounting for technical issues, such as response times and throughput, and non-technical issues, such as customer expectations, prices and customer support. One mechanism to measure these issues is by root cause analysis for network troubleshooting in a communication network. For example, a customer service assurance platform may be used to analyze performance and quality degradation from a variety of network services, such as content servers and user devices, to ensure customer service quality is consistent with communication service provider expectations.

Another mechanism to troubleshoot communication networks involves use of Key Performance Indicators (KPIs) and Key Quality Indicators (KQIs). KQIs and KPIs are typically measured in an effort to determine various performance levels of the network services such that an operator may detect any deterioration (degradation) of service levels as well as to identify the cause(s) associated with the deterioration in service level. For example, a user's device may experience poor coverage or fail to handover due to a faulty base station or a content server may suffer from a hardware issue resulting in performance degradation. However, while measurement of performance levels using KPIs may be accomplished in a relatively fast and economic manner, it is often time consuming and costly to properly measuring and calculating KQIs. As a result, QoS performance levels may not be readily identifiable.

BRIEF SUMMARY

In one embodiment, there is a non-transitory computer-readable medium storing computer instructions for processing data sets to generate data rules for the data sets in a communications network that when executed by one or more processors, perform the steps of receiving a first set of data including key quality indicators (KQIs) indicative of a quality of service associated with a source in the communication network, and receiving a second set of data including key performance indicators (KPIs) indicative of a performance level associated with the source in the communication network; categorizing the first data set using a first value into a plurality of KQI groups and the second data sets using a second value into a plurality of KPI groups, each of the KQI groups and KPI groups identified with a label; and processing each of the KQI groups and the KPI groups identified with a same label by application of association rule learning to generate the data rules, the data rules modeling a relationship between the KQIs and the KPIs by calculating association frequencies between the KQIs in the KQI groups and the KPIs in the KPI groups.

In another embodiment, there is a node for processing data sets to generate data rules for the data sets in a communications network, comprising a non-transitory memory storage comprising instructions; and one or more processors in communication with the memory, wherein the one or more processors execute the instructions to receive a first set of data including key quality indicators (KQIs) indicative of a quality of service associated with a source in the communication network, and receive a second set of data including key performance indicators (KPIs) indicative of a performance level associated with the source in the communication network; categorize the first data set using a first value into a plurality of KQI groups and the second data sets using a second value into a plurality of KPI groups, each of the KQI groups and KPI groups identified with a label; and process each of the KQI groups and the KPI groups identified with a same label by application of association rule learning to generate the data rules, the data rules modeling a relationship between the KQIs and the KPIs by calculating association frequencies between the KQIs in the KQI groups and the KPIs in the KPI groups.

In still another embodiment, there is a method of processing data sets to generate data rules for the data sets in a communications network, receiving a first set of data including key quality indicators (KQIs) indicative of a quality of service associated with a source in the communication network, and receiving a second set of data including key performance indicators (KPIs) indicative of a performance level associated with the source in the communication network; categorizing the first data set using a first value into a plurality of KQI groups and the second data sets using a second value into a plurality of KPI groups, each of the KQI groups and KPI groups identified with a label; and processing each of the KQI groups and the KPI groups identified with a same label by application of association rule learning to generate the data rules, the data rules modeling a relationship between the KQIs and the KPIs by calculating association frequencies between the KQIs in the KQI groups and the KPIs in the KPI groups.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIG. 9A illustrates a categorization table.

FIGS. 9B and 9C illustrate a KQI pattern detection table.

DETAILED DESCRIPTION

Figure 1:
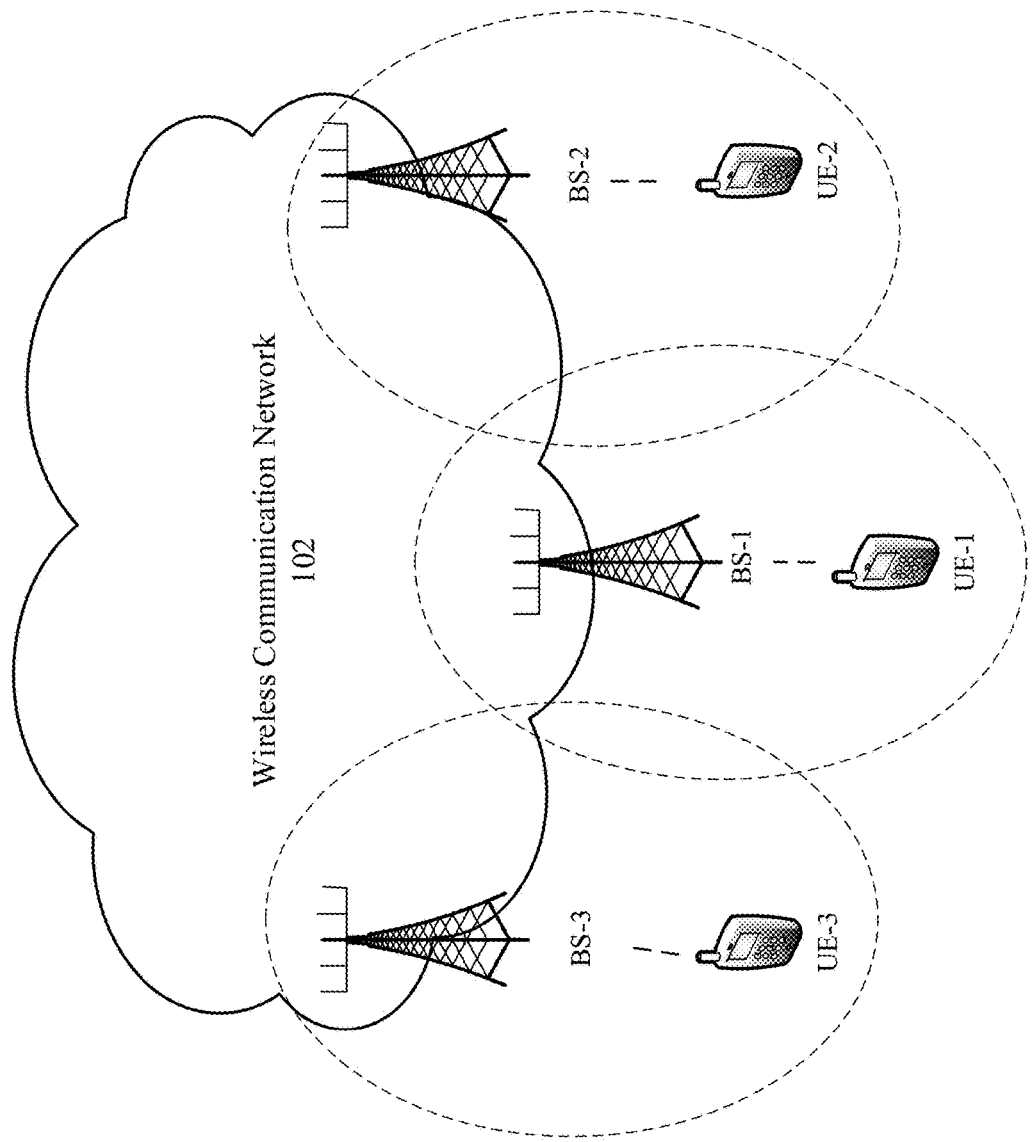
FIG. 1 illustrates a cellular communication system in accordance with one embodiment.

The disclosure relates to technology for processing data sets to generate data rules for the data sets in a communications network environment. In a networking environment, the quality of service (QoS) a network offers is an essential part of maintaining a user's experience. In order to diagnose and resolve outstanding QoS problems, networks may utilize key quality indicators (KQIs) that effectively measure the QoS in a network by monitoring network metrics and characteristics, such as average video download throughput and initial buffer time for video download. These KQIs may be calculated, for example, by continuously monitoring a particular network session for QoS using probes (e.g., detection devices, such as a sensor) installed throughout the network. However, measuring and obtaining KQI data within the network is often difficult, time consuming and expensive.

In addition to measuring KQIs, the performance level of the network may also be measured using key (or network) performance indicators (KPIs). These KPIs, such as interference and congestion counters, indicate the network performance levels at lower layers, such as the PHY layer or network layer. KPIs are typically less expensive and provide a less difficult means to monitor and calculate network metrics and characteristics compared to the KQIs. Accordingly, the proposed technology employs a feature selection and pattern mining methodology to model relationships between the KQIs and KPIs using, for example, an association rule mining approach. The formed relationship (i.e., rules) may then be used for several purposes. For example, in one embodiment, when a network anomaly is detected (e.g., KQI data values are abnormal), the rules may be used to diagnose the network and report a root cause of the anomalies. In another embodiment, in the absence of KQIs (e.g., too costly to measure), the measured KPIs can be used to predict the KQIs and thus the QoS experience of users in the network.

According to one embodiment, a root cause of anomalies and predicted KQIs may be determined using a first set of data including KQIs indicative of a quality of service and a second set of data including KPIs indicative of a performance level are received. The first data set and the second data set are categorized using a first value, such as a quantile value or a bin range or value, into a plurality of KQI groups and a second value, such as a quantile value or a bin range or value, into a plurality of KPI groups, respectively. Here, a bin value refers to, for example, the cutting point or dividing point of a range of values or to the range of values itself, as explained further below. Each of the KQI and KPI groups are identified with a label. For example, a KQI group may be labeled as "good," where the group represents "good" (or best) values. Similarly, a KIP group may be labeled with "good." Each of the KQI and KPI groups identified with a same (e.g., "good") label are processed by application of association rule learning to generate the data rules. The data rules model a relationship between the KQIs and the KPIs by calculating association (or pattern) frequencies. Once this data rule is obtained, it can be used to predict the KQI from KPIs in the absence of KQI measurements.

It is understood that the present embodiments of the invention may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the invention is intended to cover alternatives, modifications and equivalents of these embodiments, which are included within the scope and spirit of the invention as defined by the appended claims. Furthermore, in the following detailed description of the present embodiments of the invention, numerous specific details are set forth in order to provide a thorough understanding. However, it will be clear to those of ordinary skill in the art that the present embodiments of the invention may be practiced without such specific details.

FIG. 1 illustrates a wireless communications network. As shown, the wireless communication network 102 has a coverage area (dotted lines) and may include one or more user equipment (UE), such as UE-1, UE-2 and UE-3, and one or more base stations (BS), such as BS-1, BS-2 and BS-3, capable of communicating with the UEs, along with any additional elements suitable to support communication between UEs or between a UE and any other communication devices (not shown) in the wireless communication network 102.

A base station BS may be any component capable of providing wireless access by establishing uplink (UL) and/or downlink (DL) connections with the UEs, such as the base station (BS), a NodeB, an access point, a picocell, a femtocell, and other wirelessly enabled devices. There may also be D2D communication between UEs 110. UEs 110 may be any component capable of establishing a wireless connection with base station BS, such as cell phones, smart phones, tablets, sensors, etc. In some embodiments, the network 125 may include various other wireless devices, such as relays, etc.

Examples of a wireless communication network that can implement the present techniques and systems include, among others, wireless communication systems based on Code Division Multiple Access (CDMA) such as CDMA2000 1x, High Rate Packet Data (HRPD), Long-Term Evolution (LTE), LTE-advanced (LTE-A), 5-th generation (5G) cellular systems, Universal Terrestrial Radio Access Network (UTRAN), and Worldwide Interoperability for Microwave Access (WiMAX). It is appreciated that the illustrated embodiment is non-limiting, and that any number of various wireless devices and telecommunication systems may be employed, as readily appreciated to the skilled artisan.

It is appreciated that the disclosed wireless communication network is a non-limiting example, and that any number of different network components, services and devices may be employed as well understood in the art.

Figure 2:
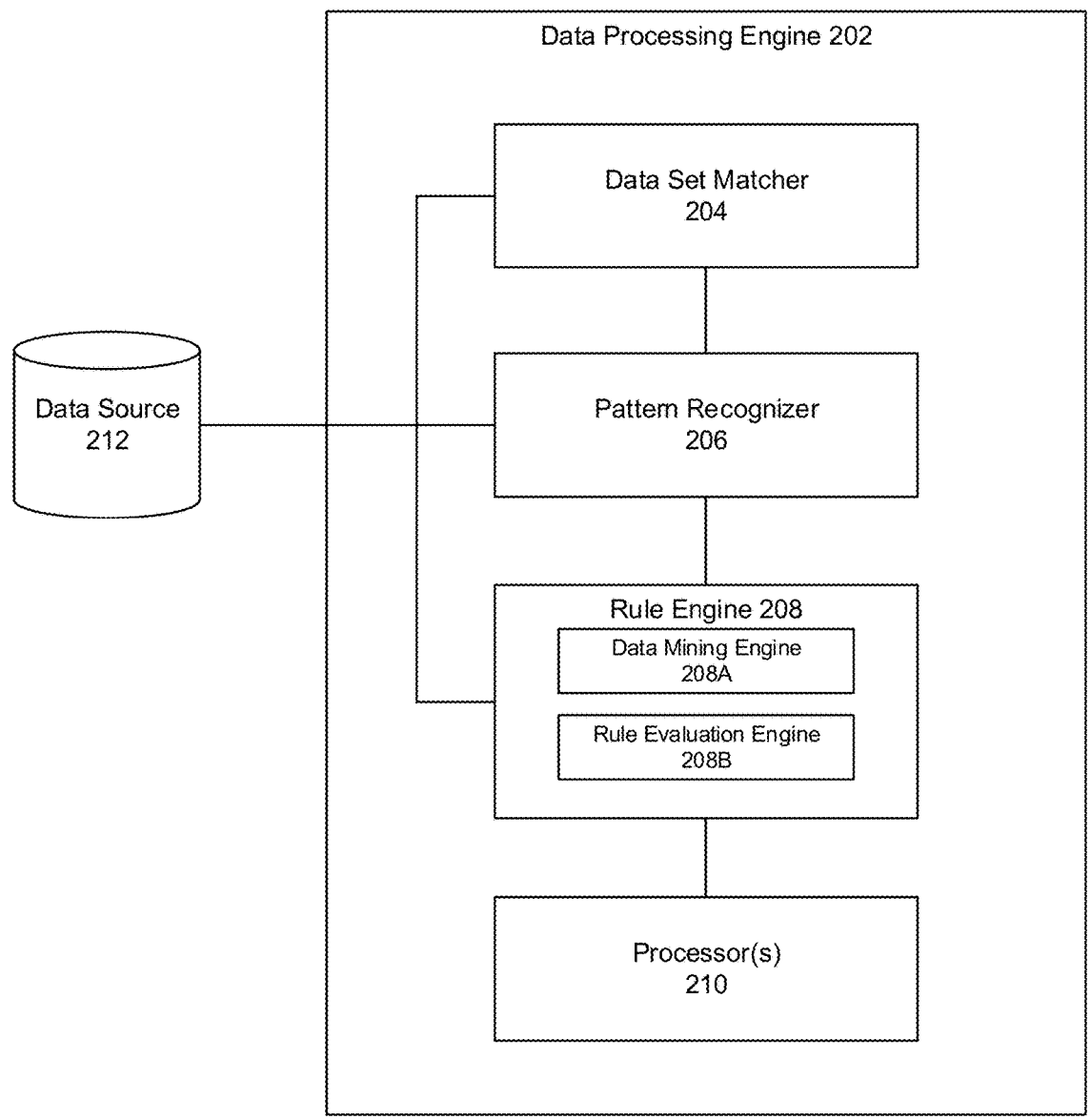
FIG. 2 illustrates an example system for pattern mining a data set using association rule learning in accordance with the system of FIG. 1.

FIG. 2 illustrates an example system for pattern mining a data set using association rule learning. The system includes, for example, a data processing engine 202 coupled to a data source 212, which may be any form of storage or storage system. The system may also include an input device (not shown) where one or more conditions or parameters of the association rules to be mined may be input. For example, the input device may be used to input the threshold conditions (e.g., thresholds for lift, support, confidence, etc., as well as the type of algorithm to implement) for the association rule to be mined. In one embodiment, the system is part of or in communication with the wireless communication network 102 (FIG. 1). Thus, networked base stations BSs, user equipment UEs and like may access the data processing engine 202.

A confidence level indicates a minimum probability at which one or more predictor conditions from predictive fields infer the predicted condition for the predicted field, i.e., the certainty in the records that are analyzed by the data processing engine 202 that one or more fields predict a condition in another field. For example, for a set of data D, the confidence is the proportion of data that contains A also contains B. A support level indicates a minimum number or percentage of records of the analyzed records that must satisfy the determined data rule. For example, in a data set D which contains the value X that occurs Y percent over the data set D must satisfy a minimum requirement or threshold. A lift value provides a measure of interest in the rule. For example, lift is the ration of the support to that expected if X and Y are independent. Lift, support and confidence are explained below in more detail.

The data processing system 202 includes, for example, a data set matcher 204, pattern recognizer 206, rule engine 208 and processor(s) 210. The data set matcher 204 may be included for mapping a first set of data to a second set of data after the data from each set has been grouped, categorized and labeled. The data set matcher 204 is provided to transform groups of data in the data set to provide categories that describe the group such that the groups may be labeled. For example, a group of a first data set may include values that demonstrate poor QoS over a defined time period. The group may then be categorized as a poor QoS category and labeled as such. Similarly, another group of a second data set may include values that demonstrate poor performance over a defined time period. This group may be categorized as a poor performance category and labeled as such. The data set matcher 204 may then match or associate groups having a cell ID (over a time interval) for which the groups have the same label (e.g., poor). Thus, each of the matched groups may be applied with the data mining techniques described herein to provide improved pattern correlation.

The data processing engine 202 also includes a pattern recognizer 206 to identify frequent patterns occurring in the first and second sets of data stored in the data source 212. In the disclosed embodiments, the patterns are recognized from the data and data sets stored in the data source 212. For example, the pattern recognizer 206 may use an apriori algorithm, eclat algorithm or FP-Growth technique to identify frequent patterns in the data stored in the database 212 (these algorithms, as will become clear from the description below, may also be used in data mining and rule evaluation). The pattern recognizer 206 may also be responsible for generating frequent patterns for analysis by the rule engine 208, and in particular the data mining engine 208A. However, it is appreciated that the data sets may be generated, and patterns detected, in real-time. Moreover, the data sets may be collected and retrieved from any network component, such as the UEs or base stations BSs, and are not limited to collection and storage in the data source 212.

In one embodiment, the pattern recognizer 206 may determine if patterns are becoming more or less frequent over time. For example, applying a shorter time interval for determining pattern frequency generally increases the weighting of recent pattern frequency, but typically lowers the amount of statistical significance to the data. Conversely, using longer time periods for determining pattern frequency yields more statistical confidence in the data, but decreases the accuracy due to the inclusion of older pattern frequency data. Thus, in one embodiment, the pattern recognizer 206 may evaluate different time intervals to recognize different time slices of data generated across the network.

The rule engine 208 is responsible for generating association rules from the pattern information determined by pattern recognizer 206, and includes a data mining engine 208A and rule evaluation engine 208B (described below). The pattern recognizer 206 may be part of the rule engine 208 and/or implemented independently (as depicted). Thus, in one embodiment, the database 212 may be connected to rule engine 208, the pattern recognizer 206 and/or the data set matcher 204. In another embodiment, collected data or data from the database 212 may be matched by the data set matcher 204, passed to the pattern recognizer 206 for processing to identify patterns, and then passed to the rule engine 208 for rule generation.

The data mining engine 208A may implement one or more data mining functions or algorithms that analyze data to produce the data mining models. For example, similar to the pattern recognizer 206, the data mining engine 208A may also utilize a data mining association rules algorithm, such as the apriori, eclat and FP-growth algorithms, to generate data rules from the data sets. The data mining engine 208A may also be implemented using any well-known techniques, and is not limited to implementation of the aforementioned algorithms.

In one embodiment, the algorithms may produce association rules models as defined in the predictive model markup language (PMML) standard. The association rule model represents rules where some set of data is associated to another set of data. For example a rule can express that a certain QoS (KQI) level often occurs in combination with a certain set of performance (KPI) levels. For example, the association algorithm may receive as an input cell identifiers (IDs) (and associated timestamps) along with corresponding KQI and KPI values, as depicted for example in FIG. 9A. As illustrated in FIG. 9A, which is explained below in more detail, the cell IDs and timestamps are depicted in the first two columns, followed by the KQI in group 1 (column three) and the KPIs in one of groups 1-4 (remaining columns four to twenty). The association algorithm may then search for relationships between the KQI of group 1 at each cell ID and the KPIs of group 1 at the associated timestamps. For example, for KQI (HTTP_Page_Large_Display_Rate_kbps)=1 at cellID=36168, timestamp=5/31/201 8:00, the KPI (ULCECongNum=1 at cellID=36168, timestamp=5/31/201 8:00. Thus, there is an association between the KQI and the KPI.

The data mining engine 208A then uses the association rules algorithm to generate all data rules that satisfy the specified metrics, such as lift, support and confidence.

The generated data rules may then be loaded to a rule evaluation engine 208B which executes the rules against selected tables and records from the data source 212, capturing results and analysis. That is, the data records in the data source 212 may be processed by the rule evaluation engine 208B applying the data rules to determine data records that have values that deviate from the values that are expected by the rules.

Figure 3:
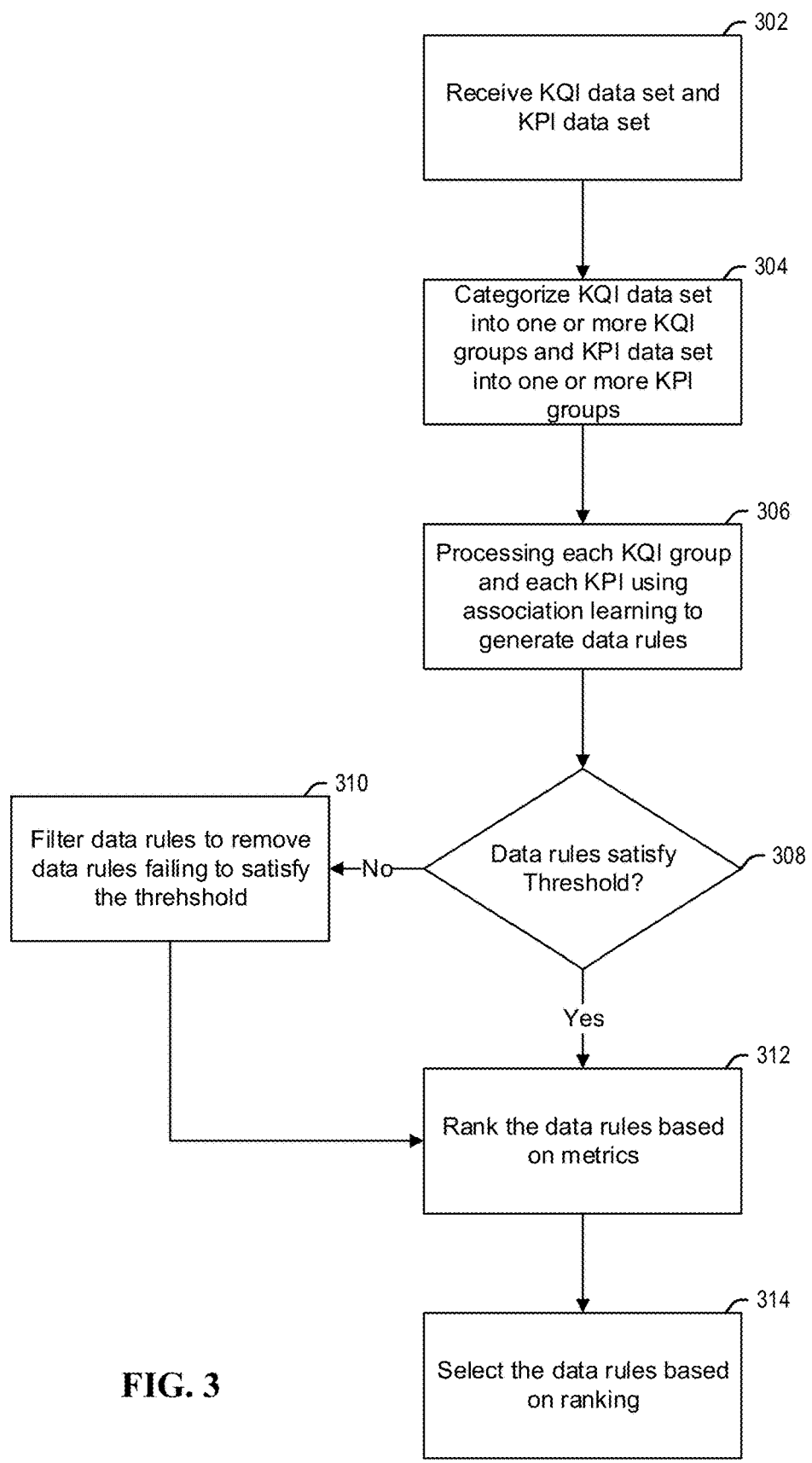
FIG. 3 illustrates a flow diagram of processing data sets to generate association rules.

FIG. 3 illustrates a flow diagram of processing data sets to generate association rules. In the description that follows, the data processing engine 202 implements the procedures. As previously discussed, the data processing engine 202 may be an independent component on the network or included as part of any network component. For example, the data processing engine 202 may be part of the base station BS, user equipment UE or any other component. Moreover, the implementation is not limited to implementation by the data processing engine 202. For example, any network component (such as those depicted in FIGS. 1, 10 and 11) may be responsible for implementing the disclosed procedures, as appreciated by the skilled artisan.

At 302, the KQI data set and the KPI data set are received by the data processing engine 202. The KQI data set may include various QoS indicators, such as HTTP_Page_Large_Display_Rate_kbps. The KPI data set may include various performance indicators, such as HTTP+Page_CountBm. The collection of the KQI and KPI data that forms the data sets is described with reference to FIG. 4 below.

The KQI data set and the KPI data set are processed and categorized, for example by the data set matcher 204, into one or more KQI groups and KPI groups, respectively, at 304. In one embodiment, groups may be formed by quantizing the data (as explained below with reference to FIG. 4). For example, KPIs may be categorized into one of the following: network accessibility, call retainability, device mobility, network capacity, etc. KQIs may also be categorized in a similar manner. Once categorized, the KQIs and KPIs may then be grouped into data sets, for example where each group has KQIs or KPIs in a same category(ies).

At 306, and after each of the KQI and KPI groups have been labeled, the data processing engine 202 applies association rule learning to generate data rules. For example, and as described in detail above, the association modeling attempts to find associations, such as common or frequent patterns and trends in the data sets. These associations are supported by statistical correlations between different attributes of the dataset and are extracted by imposing the aforementioned lift, support, and confidence thresholds. For example, and with reference to FIG. 9A, the KQI (group=1) in column three is associated with the KPI (group=1) in column eight. Thus, for example, a KQI of HTTP_Page_Large_Display_Rate_kbps=1 is associated with a KPI of ULCECongNum=1.

The data rules generated by the processing engine 202 are compared to the lift, support and confidence thresholds (or any other metric) to determine whether the specific data rule meets the threshold requirement at 308. If the data rule fails to satisfy the threshold value, then the process proceeds to 310, and the data rule is filtered (i.e., removed) from the list of generated data rules. For example, a lift threshold of 1.5 may be selected. Any KPI having a lift value less than 1.5 will not satisfy the threshold and will be removed as a data rule. Otherwise, if the threshold value is satisfied at 308 (or after removal of data rules failing to satisfy the threshold), then the process proceeds to 312 and the data rules are ranked based on the various metrics, such as the calculated lift, support and confidence. At 314, the data rules are selected by the processing engine 202 based on the ranking.

Figure 4:
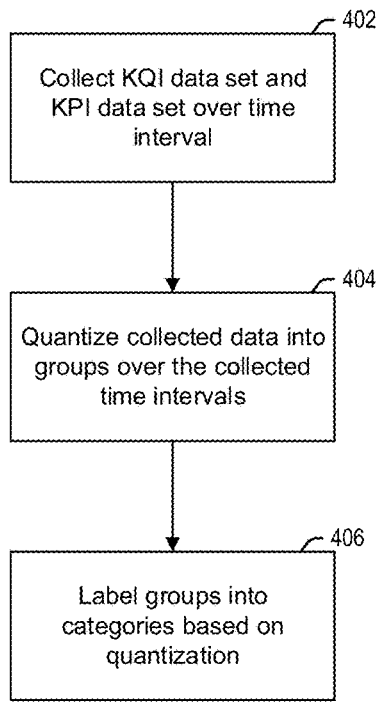
FIG. 4 illustrates a flow diagram of data collection in accordance with the embodiments of FIGS. 1 and 2.

FIG. 4 illustrates a flow diagram of data collection in accordance with the embodiments of FIGS. 1 and 2. Similar to the discussion of FIG. 3, the processes described herein is performed by the data processing engine 202. However, implementation of the process in FIG. 4 is not limited to the data processing engine.

The received KQI and KPI data (302, FIG. 3) are collected, for example, over a time series, comprising individual time intervals at 402. In one embodiment, an element management system (EMS) (not shown) collects the data characteristic of the network performance from a base station BS and performs calculations to obtain the statistical data characterizing the network performance. It is appreciated, however, that any network component may collect the data characteristic of network performance, and that such collection is not limited to the EMS. For example, the base station BS or user equipment UE may also be responsible for such collection. Such data characteristic of the network performance includes data related to telephone traffic, data related to neighbor relationship, data related to coverage, or the like. In another embodiment, the EMS indirectly calculates user equipment UE service experience data and performance statistical data from data directly reported by the user equipment UE, data characteristic of the network performance forwarded through the base station BS or data characterizing the network performance reported by the base station BS.

At 404, the collected data are quantized into groups over the time interval by the data processing engine 202. In one example of categorizing and grouping the KQI and KPI data, the KQI and KPI raw data are categorized using their quintile values into specific layers for association rule mining. In one example embodiment, with reference to FIG. 9A, the KQI data are divided into bins and set to be 20%, 40% and 100%. For the KPI data, the bins are set to be 5%, 30%, 60% and 100%. Once the KQI and KPI data have been categorized, the KQI and KPI data are grouped. In the example, the KQI data are placed into three groups, namely 0-20 (representing 5%); 24-40 (representing 30%) and 40-100 (representing 100%). The KPI data are placed into four groups, namely 0-5 (representing 5%), 5-30 (representing 30%), 30-60 (representing 60%) and 60-100 (representing 100%).

At 406, the KQI and KPI groups are labeled into categories based on the quantization. For example, a first KQI group may be labeled as Group 1 (5%). KPIs that occur during the time interval of KQI Group 1 will be used for association by the association rule learning to generate the data rules.

Figure 5:
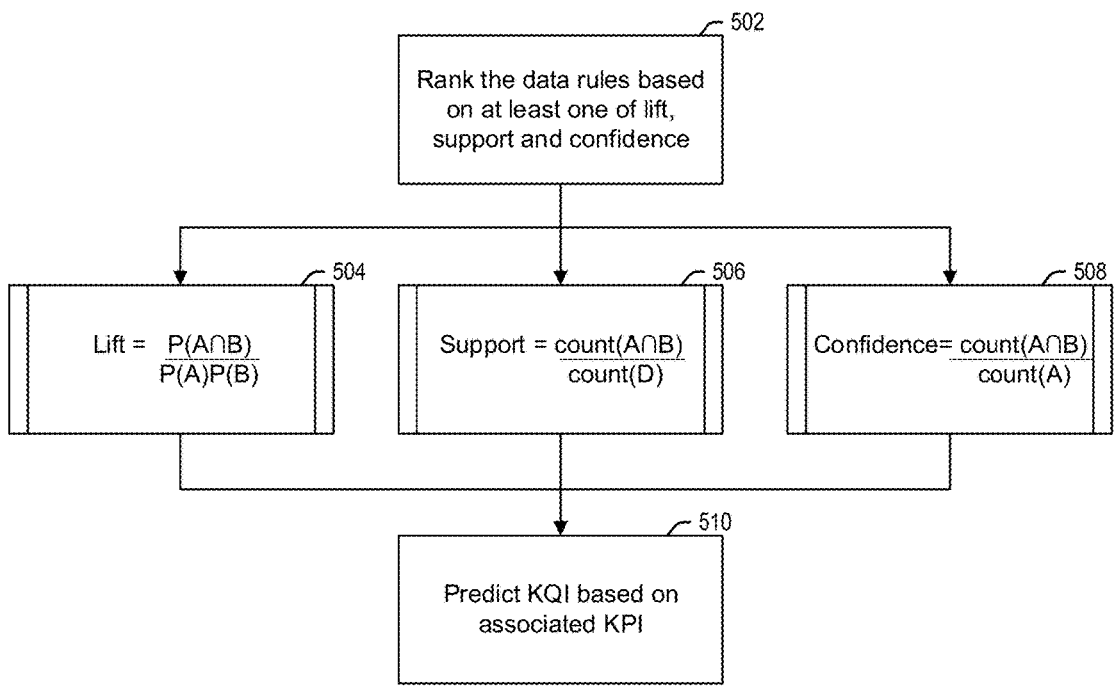
FIG. 5 illustrates a flow diagram of predicting quality of service indicators based on performance indicators from the rules learned from historic data.

FIG. 5 illustrates a flow diagram of predicting quality of service indicators based on performance indicators. At 502, the data processing engine 202 ranks the generated data rules based on at least one of lift, support and confidence. The performance of rules or rule sets may be evaluated based on one or more metrics. The one or more metrics may include but is not limited to support, confidence, lift and any combination thereof.

Support is a measure of the percentage of task-relevant data transactions for which a rule is satisfied. A task-relevant data transaction as the term is used in the disclosed embodiment, may include for example measurement of KPIs or KQIs. That is, a transaction A may be a measurement of KQIs and a transaction B may be a measurement of KPIs. For example, the support for the rule A→B may be measured by (number of transactions containing both A and B)/(number of total transactions) or by the equation (506):

$$\text{Support} = \frac{\text{count}(A \cap B)}{\text{count}(D)},$$

where D is the entire data set (total transactions). Thus, the support for the rule A→B may be a measure of (number of measurements containing both KQI and KPI)/(number of total measurements).

Confidence is the measure of certainty or trustworthiness associated with each discovered pattern. For example, the confidence for the rule A→B may be measured by (number of transactions containing both A and B)/(number of transactions containing A) or by the equation (508):

$$\text{Confidence} = \frac{\text{count}(A \cap B)}{\text{count}(A)}.$$

Thus, the confidence for the rule A→B may be a measure of (number of measurement containing both KQI and KPI)/(number of measurements containing KQI).

Lift is a measure of the probability of a transaction occurring divided by the probability that an event occurs. For example, the lift for the rule A→B may be measured by ((number of transactions containing both A and B)/(number of transactions containing A))/((number of transactions containing B)/(total number of transactions)) or by the equation (504):

$$\text{Lift} = \frac{P(A \cap B)}{P(A)P(B)}.$$

Thus, the lift for the rule A→B may be a measure of ((number of measurements containing both KQI and KPI)/(number of measurements containing KQI))/((number of measurements containing KPI)/(total number of measurements)).

At 510, the data processing engine 202 predicts the KQI based on the associated KPIs from the determined rules. The predication is based on the filtered data rules and ranking, as explained above.

Figure 6:
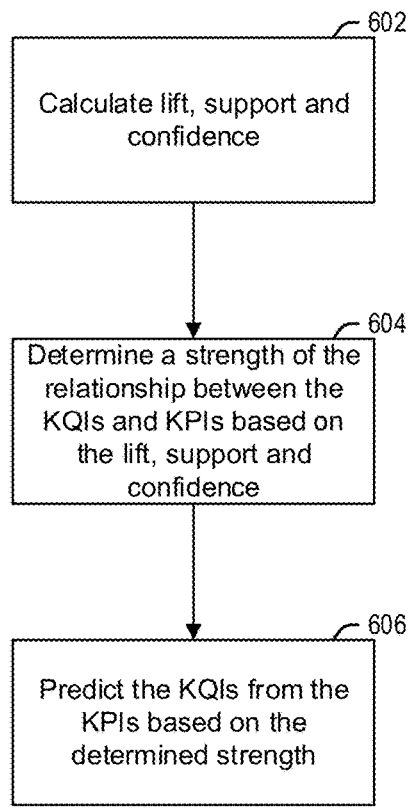
FIG. 6 illustrates a flow diagram of determining a strength of relationship between quality of service indicators and performance indicators

FIG. 6 illustrates a flow diagram of determining a strength of relationship between quality of service indicators and performance indicators. At 602, the lift, support and confidence levels are calculated for a specific data set, as explained with reference to FIG. 5. A specific data set including an antecedent and consequent that is being mined, where the antecedent in a controlled variable (or easily identifiable, such as KPIs) and the consequent is a predicted variable (such as KQIs), is provided in the table below:

| Antecedent | Consequent |
|---|---|
| A | 0 |
| A | 0 |
| A | 1 |
| A | 0 |
| B | 1 |
| B | 0 |
| B | 1 |

Upon application of an association rule learning algorithm, the following data rules may be generated based on the frequent patterns: Rule 1: A→0 and Rule 2: B→1. Although the example is expressed in terms of an antecedent A/B and a consequent 0/1, the calculations are equally applicable to KQI and KPI data and data sets.

Applying the equations for the lift, support and confidence above, the support is 3/7 for rule 1 (number of items in the data set in which the antecedent is A and the consequent is 0), and the support is 2/7 for rule 2 (number of items in the data set in which the antecedent is B and the consequent is 1). The confidence for rule 1 is 3/4 (three of the four records that meet the antecedent of A meet the consequent of 0), and the confidence for rule 2 is 2/3 (two of the three records that meet the antecedent of B meet the consequent of 1). The lift for rule 1 is (3/4)/(4/7)=(3/7)/(4/7*4/7)=21/16≈1.31, and the lift for rule 2 is (2/3)/(3/7)=(2/7)/(3/7*3/7)=14/9≈1.56.

At 604, the processing engine 202 may determine a strength of the relationship between the antecedent and consequent based on the metrics (e.g., lift, support and confidence). For example, rule 2 has a higher lift (≈1.56) than the rule 1 lift (≈1.31). Thus, even though rule 1 has a higher confidence, rule 2 provides a stronger degree to which the occurrences are dependence on one another, and therefore is potentially more useful for predicting the consequent for future data sets.

The processing engine 202 may then predicts KQIs based on the KPIs and the determined strength of the relationship between the two at 606. For example, in another embodiment, the confidence may be used to measure the strength of the association rules. Thus, suppose the confidence of the association rule KQI→KPI is 80%. Then, 80% of the measurements that contain KQI also contain KPI together. Using this technique, the processing engine 202 may predict a KQI with 80% strength based on the measured KPI.

Figures 7, 8:
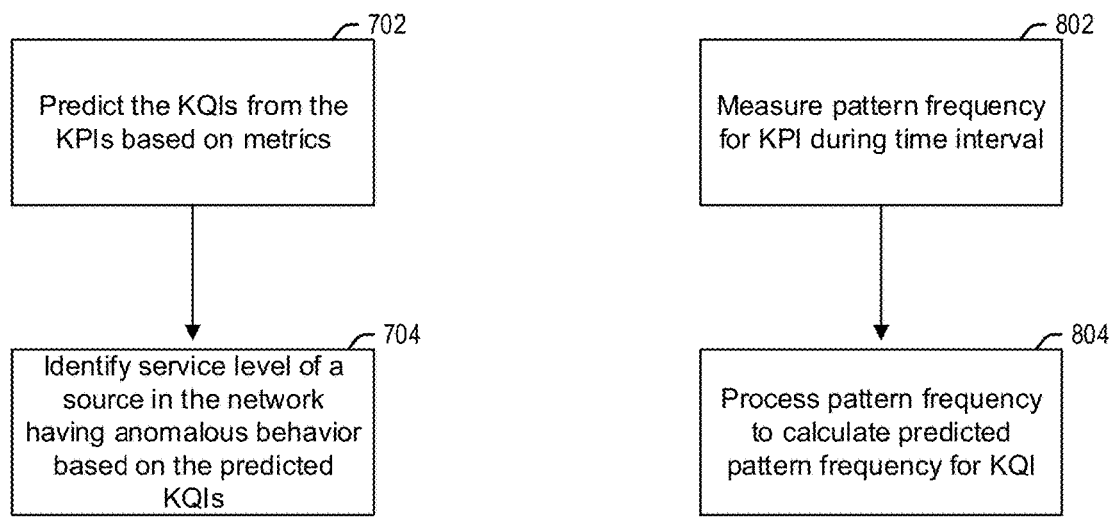
FIG. 7 illustrates a flow diagram of identifying performance levels of a data source.
FIG. 8 illustrates a flow diagram of measuring pattern frequency.

FIG. 7 illustrates a flow diagram of identifying service levels of a data source. One mechanism to troubleshoot communication networks involves use of KPIs and KQIs. As appreciated, KQIs and KPIs are typically measured in an effort to determine various performance levels of the network services such that an operator may detect any deterioration (degradation) of service levels as well as to identify the cause(s) associated with the deterioration in service level. For example, a user's device may experience poor coverage or fail to handover due to a faulty base station or a content server may suffer from a hardware issue resulting in performance degradation.

At 702, the processing engine 202 predicts the KQIs from the KPIs based on the aforementioned metrics, as explained above. From the predicted KQIs, the processing engine 202 may identify the service level of a source in the network at 704. The determined service level may then be used to determine whether anomalous behavior exists at the source. Thus, the predicted KQI may be used to detect the root cause of the anomalous behavior.

FIG. 8 illustrates a flow diagram of measuring pattern frequency. The data processing engine 202 measures the association or pattern frequency for KPI during a time interval at 802. For example, pattern frequency may be calculated using an approximation curve based on historical association or pattern frequencies. In one embodiment, the employed technique determines a count for each indicator in a measurement database, divides the information into predetermined date ranges for purposes of determining the pattern count values in each date range and then calculates the predicted pattern frequency based on historical pattern frequency data. Although any number of techniques may be used to calculate the predicted pattern frequency information, one example is to apply a regression analysis, such as a least-squares approximation or other higher order interpolation technique.

The association (or pattern) frequency may then be processed by the data processing engine 202 to calculate the predicted association (or pattern) frequency for the KQI based on the KPI at 804, as explained above.

FIG. 9A illustrates a categorization table created as a result of implementing the procedures in FIGS. 3-8. In the following examples, the EMS (not shown), data processing engine 202 or any other network component, measures and collects the KQI and KPI data and data sets. KQI and KPI data may include, but is not limited to, attributes such as those in the following table.

| KQI Data | KPI Data |
| --- | --- |
| HTTP_Page_Large_Display_Rate_kbps | MeanTotalTcpUtilityRatio |
| HTTP_Page_Response_Delay_s | PilotPollutionRatio |
| | VS_MeanRTWP_dBm |
| | HSDPACallDropRatio |
| | ULCECongNum |
| | ULPowerCongNum |
| | DLPowerCongNum |
| | CodeCongNum |
| | HSDPARLCRetransmittedRatio |
| | HTTP_Page_Count |
| | BestCellECNO |
| | VS.RLC.AM.Tx.HsdpaTrf.PDU.packet |
| | RanCong |
| | VS.CellDCHUEs |
| | MeanTotalTcpUtilityRatio |

In one embodiment, to predict a specific KQI from the measured KPI data, a KQI attribute is selected. For example, the KQI data (HTTP_Page_Response_Delay_s) is selected as the KQI to predict using the measured KPI data by application of the data rules. The example will be illustrated further in the discussion of FIG. 9B below. In another example, the KQI data (HTTP_Page_Large_Display_Rate_kbps) is selected as the KQI to predict using the measured KPI data by application of the data rules. The example will be illustrated further in the discussion of FIG. 9C below.

FIGS. 9B and 9C illustrate a KQI pattern detection table using the categorized data in FIG. 9A. FIG. 9B illustrates a KQI pattern detection table for KQI data (HTTP_Page_Response_Delay_s). The KPI data selected in the column labeled ("KPI") is a list of the KPI data selected to predict KQI data based on the ranked data rules, as explained above, and that meets a lift threshold that is greater than or equal ($\geq$) to 1.5. It is appreciated that the threshold of 1.5 is a non-limiting example, and that any metric and any number may be used as the threshold. In this example, the KPI column is generated based on the associations learned in the table of FIG. 9A for which the calculated lift satisfies the threshold. For example, KPI values having a lift threshold$\geq$1.5 satisfy the threshold data rule requirement. KPI values having a lift threshold<1.5 fail to satisfy the threshold and are removed from the KPI data set.

FIG. 9C illustrates a KQI pattern detection table for KQI data (HTTP_Page_Large_Display_Rate_kbps). The KPI data selected in the column labeled ("KPI") is a list of the KPI data selected to predict KQI data based on the ranked data rules, as explained above, and that meet a lift threshold that is greater than or equal ($\geq$) to 1.5. It is appreciated that the threshold of 1.5 is a non-limiting example, and that any metric and any number may be used as the threshold. In this example, the KPI column is generated based on the associations learned in the table of FIG. 9A for which the calculated lift satisfies the threshold. For example, KPI values having a lift threshold$\geq$1.5 satisfy the threshold data rule requirement. KPI values having a lift threshold<1.5 fail to satisfy the threshold and are removed from the KPI data set. In this example, the KPI and KQI=1 and the indicators belong to the first category. More specifically, the KQI and KPIs are larger (or smaller depending on the specific KQI and KPI) than the given threshold. In this case, KQI=1 means HTTP_Page_Response_delay is larger than 1.05 (20%) and MeanTotalUtilityRatio is larger than 0.898.

Figure 10:
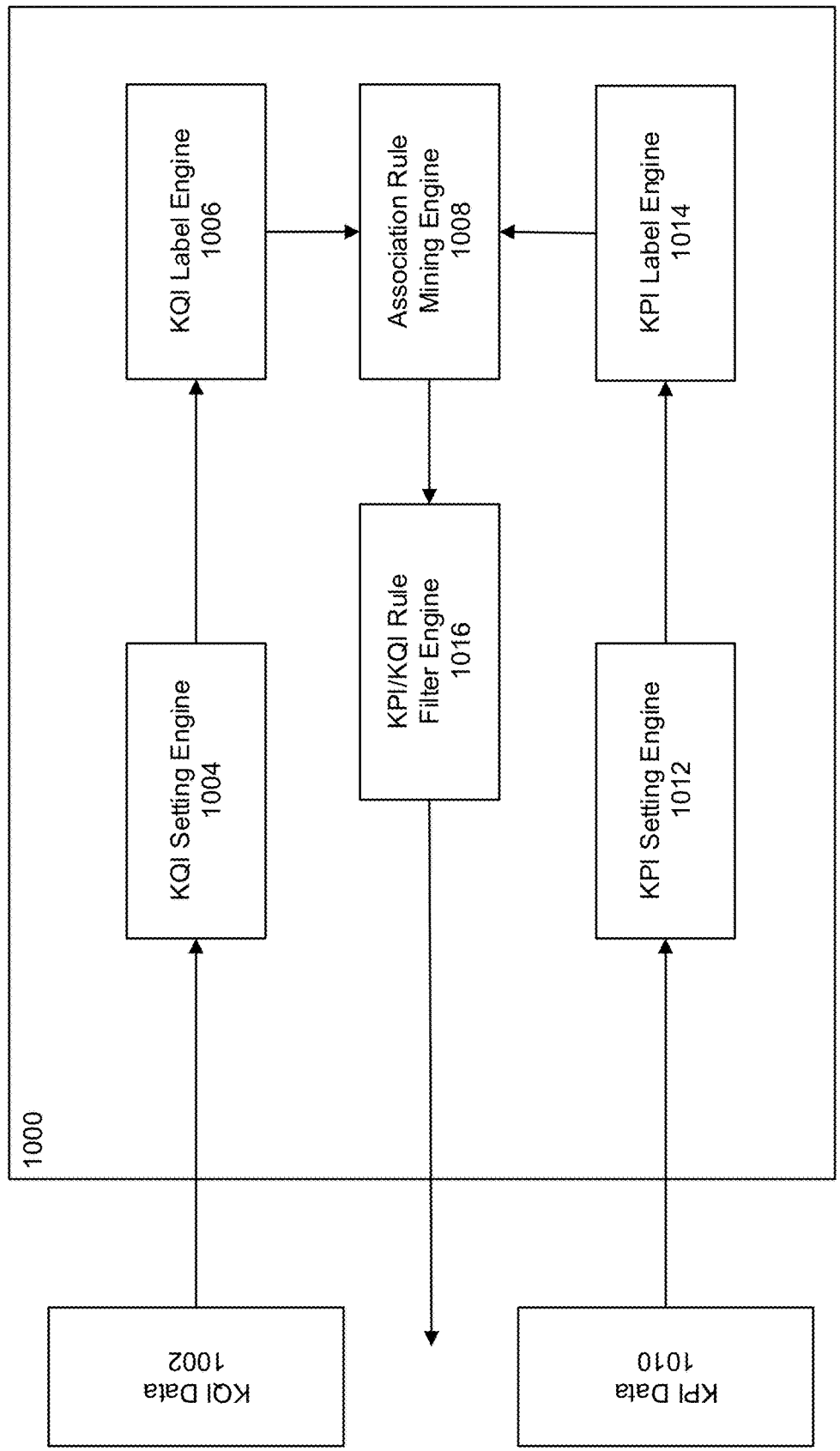
FIG. 10 illustrates a system to implement the processes in accordance with FIGS. 3-8.

FIG. 10 illustrates a system to implement the processes in accordance with FIGS. 3-8. The system 1000 processes data sets to generate data rules for the data sets in the wireless communication network 102, and may be implemented as the data processing engine 202 (FIG. 2), part of the data processing engine 202, or any component in the wireless communication network 102, such as a base station BS or user equipment UE.

Two data sets are generated by network components and/or stored in a data source, such as data source 212. A first set of data includes KQI data 1002, which are indicative of a Qos associated with a source in the network. A second set of data includes KPI data 1010, which are indicative of a performance level associated with the source in the network. In one embodiment, the data sets are collected over several time intervals (i.e., a time series).

The KQI data 1002 and the KPI data 1010 are then categorized by the KQI setting engine 1004 and KPI setting engine 1012, respectively, into a plurality of KQI and KPI groups. The groups may be defined, for example, by quantizing the collected first data set and second data set by KQI labeling engine 1006 and KPI labeling engine 1014, respectively. The KQI groups and the KPI groups identified with the same label are then processed by association rule mining engine 1008 by application of association rule learning to generate the data rules. In one embodiment, the data rules model a relationship between the KQIs and the KPIs by predicting pattern frequencies between the KQIs in the KQI groups and the KPIs in the KPI groups. In another embodiment, identifying a quality of service level of a source in the communication system having anomalous behavior based on the predicted KQIs.

The data rules are then filtered by KPI/KQI rule filter engine 106 to determine whether each of the data rules satisfies a threshold. For example, the data rules may be individually examined to determine whether the data rule satisfies a specified threshold for lift, support and/or confidence. Data rules that fail to satisfy the threshold requirement(s) are removed from the final set of data rules by the KPI/KQI rule filter engine 1016.

The final set of data rules may then be ranked based on metrics including, for example the lift, support and confidence. For example, data rule having a higher confidence value may be ranked higher than data rules with a lower confidence value. In one embodiment, the data rules according to the ranking are selected as the final rule set in the ranked order.

Figure 11:
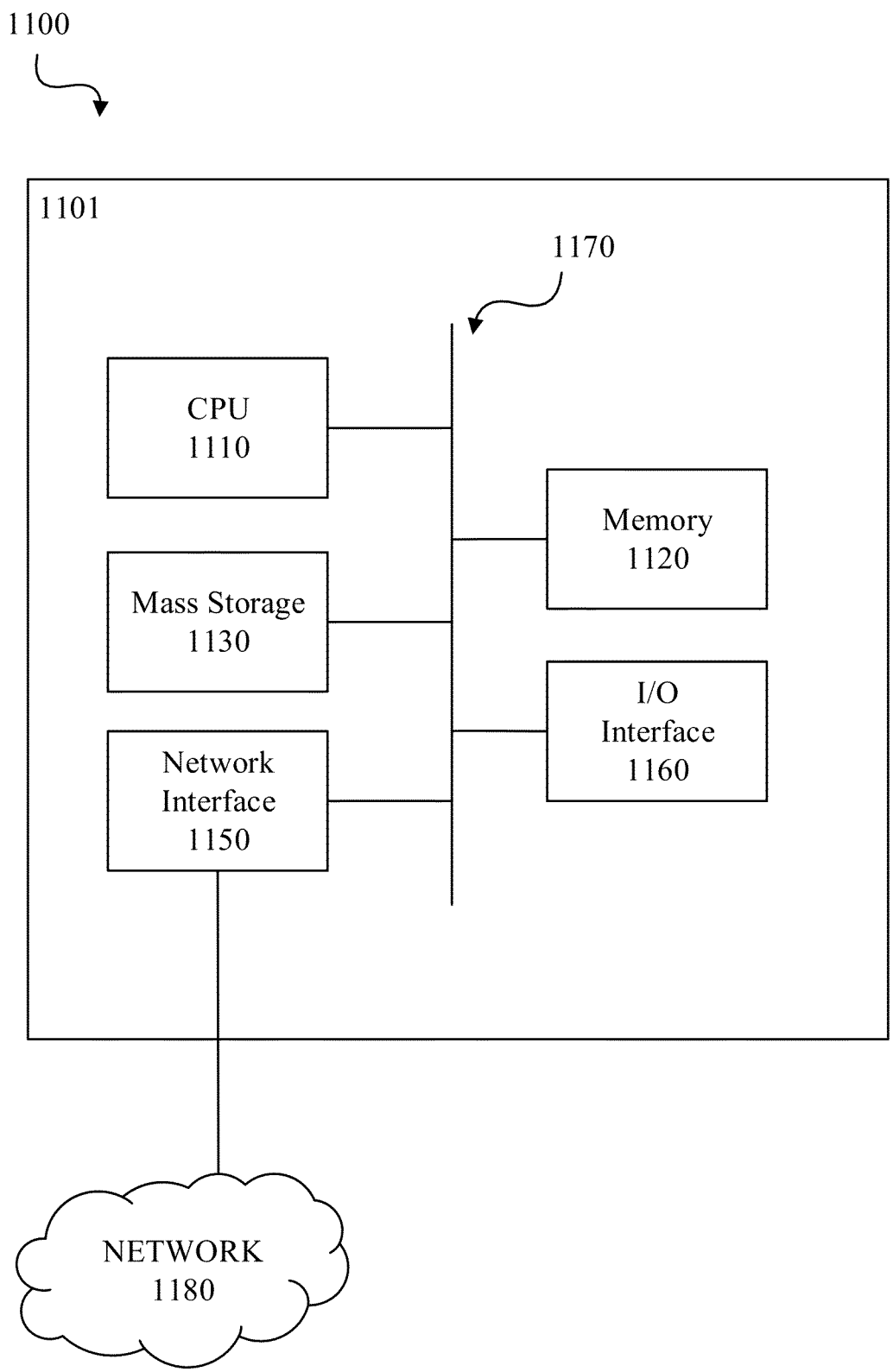
FIG. 11 illustrates a block diagram of a network system that can be used to implement various embodiments.

FIG. 11 is a block diagram of a network system that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The network system may comprise a processing unit 1101 equipped with one or more input/output devices, such as network interfaces, storage interfaces, and the like. The processing unit 1101 may include a central processing unit (CPU) 1110, a memory 1120, a mass storage device 1130, and an I/O interface 1160 connected to a bus. The bus may be one or more of any type of several bus architectures including a memory bus or memory controller, a peripheral bus or the like.

The CPU 1110 may comprise any type of electronic data processor, which may be configured to read and process instructions stored in the memory 1120. The memory 1120 may comprise any type of system memory such as static random access memory (SRAM), dynamic random access memory (DRAM), synchronous DRAM (SDRAM), read-only memory (ROM), a combination thereof, or the like. In an embodiment, the memory 1120 may include ROM for use at boot-up, and DRAM for program and data storage for use while executing programs. In embodiments, the memory 1120 is non-transitory. The mass storage device 1130 may comprise any type of storage device configured to store data, programs, and other information and to make the data, programs, and other information accessible via the bus. The mass storage device 1130 may comprise, for example, one or more of a solid state drive, hard disk drive, a magnetic disk drive, an optical disk drive, or the like.

The processing unit 1101 also includes one or more network interfaces 1150, which may comprise wired links, such as an Ethernet cable or the like, and/or wireless links to access nodes or one or more networks 1180. The network interface 1150 allows the processing unit 1101 to communicate with remote units via the networks 1180. For example, the network interface 1150 may provide wireless communication via one or more transmitters/transmit antennas and one or more receivers/receive antennas. In an embodiment, the processing unit 1101 is coupled to a local-area network or a wide-area network for data processing and communications with remote devices, such as other processing units, the Internet, remote storage facilities, or the like.

As a result of the data rule modeling and cause analysis discussed above, several advantages are provided including, but not limited to, rules discovered by the association rule learning approach serve as a "knowledge database" for understanding how different network conditions, such as the congestion and coverage, will affect the experience of users, and the rules can be used for diagnosing network problems and to predict network KQIs in the event that direct measurement is difficult, such as measurement is time consuming or costly.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable medium storing computer instructions for processing data sets to generate data rules for the data sets in a communications network that when executed by one or more processors, perform the steps of:

receiving a first set of the data, identified by monitoring one or more network components in the communications network, including key quality indicators (KQIs) indicative of a quality of service associated, and receiving a second set of the data, identified by monitoring the one or more network components in the communications network, including key performance indicators (KPIs) indicative of a performance level;

categorizing the first set of data using a first value into one or more KQI groups and the second set of data using a second value into one or more KPI groups, each of the one or more KQI groups and KPI groups identified with a label;

determining one or more relationships between the KQIs and the KPIs based on pattern frequencies identifying a correlation between the KQIs in the KQI groups and the KPIs in the KPI groups; and generating the data rules based on the one or more relationships to predict the KQIs using the KPIs.

2. The non-transitory computer-readable medium of claim 1, wherein the instructions further comprise computer instructions for:

determining whether each of the data rules satisfy a threshold;

removing the data rules from the first and second sets of the data that fail to satisfy the threshold;

ranking the data rules based on metrics including at least one of lift, support and confidence; and selecting the data rules according to the ranking.

3. The non-transitory computer-readable medium of claim 1, wherein the instructions further comprise computer instructions for:

collecting the first set of the data and the second set of the data over a time interval;

quantizing the collected first set of the data and the second set of the data to define the KQI groups and the KPI groups; and predicting the KQIs using the KPIs based on the data rules.

4. The non-transitory computer-readable medium of claim 1, wherein the labeling is based on the categorization, and the processing of the KQI groups and the KPI groups are over the time interval.

5. The non-transitory computer-readable medium of claim 2, wherein the threshold is one of lift, support and confidence.

6. The non-transitory computer-readable medium of claim 5, wherein the data rules are ranked according to a measured value of at least one of the lift, the support and the confidence, where $$\text{Lift} = \frac{P(A \cap B)}{P(A)P(B)}, \text{Support} = \frac{\text{count}(A \cap B)}{\text{count}(D)},$$

$$\text{and Confidence} = \frac{\text{count}(A \cap B)}{\text{count}(A)},$$

where

P is defined as a pattern,

D is defined as a total of the first and second sets of the data, and

A and B are defined as variables representing data in the first and second sets of the data.

7. The non-transitory computer-readable medium of claim 2, wherein at least one of the lift, the support and the confidence determine a strength of the relationship between the KQIs in the KQI groups corresponding to the KPIs in the KPI groups.

8. The non-transitory computer-readable medium of claim 3, wherein the instructions further comprise:

measuring frequencies for the second set of the data based on the number of times a pattern occurs in the time interval, and processing the the number of times the pattern occurs to calculate the predicted pattern frequency for the first set of the data.

9. The non-transitory computer-readable medium of claim 1, wherein the instructions further comprise computer instructions for storing the data rules in a storage system accessible by the communications network.

10. The non-transitory computer-readable medium of claim 1, wherein the association rule learning is implemented using one of an apriori algorithm, eclat algorithm and FP-growth algorithm.

11. The non-transitory computer-readable medium of claim 3, wherein the instructions further comprise computer instructions for identifying a quality of service (QoS) level of the one or more network components in the communications network having anomalous behavior based on the predicted KQIs.

12. A node for processing data sets to generate data rules for the data sets in a communications network, comprising:

a non-transitory memory storage comprising instructions; and one or more processors in communication with the memory, wherein the one or more processors execute the instructions to:

receive a first set of the data, identified by monitoring one or more network components in the communications network, including key quality indicators (KQIs) indicative of a quality of service associated, and receive a second set of the data, identified by monitoring the one or more network components in the communications network, including key performance indicators (KPIs) indicative of a performance level;

categorize the first set of data using a first value into one or more KQI groups and the second set of data using a second value into one or more KPI groups, each of the one or more KQI groups and KPI groups identified with a label;

determine one or more relationships between the KQIs and the KPIs based on pattern frequencies identifying a correlation between the KQIs in the KQI groups and the KPIs in the KPI groups; and generate the data rules based on the one or more relationships to predict the KQIs using the KPIs.

13. The node of claim 12, wherein the one or more processors further execute instructions to:

determine whether each of the data rules satisfy a threshold;

remove the data rules from the first and second sets of the data that fail to satisfy the threshold;

rank the data rules based on metrics including at least one of lift, support and confidence; and select the data rules according to the ranking.

14. The node of claim 12, wherein the one or more processors further execute instructions to:

collect the first set of the data and the second set of the data over a time interval;

quantize the collected first set of the data and the second set of the data to define the KQI groups and the KPI groups; and predict the KQIs using the KPIs based on the data rule.

15. The node of claim 12, wherein the labeling is based on the categorization, and the processing of the KQI groups and the KPI groups are over the time interval.

16. The node of claim 13, wherein the threshold is one of lift, support and confidence.

17. The node of claim 16, wherein the data rules are ranked according to a measured value of at least one of the lift, the support and the confidence, where $$\text{Lift} = \frac{P(A \cap B)}{P(A)P(B)}, \text{Support} = \frac{\text{count}(A \cap B)}{\text{count}(D)},$$

-continued $$\text{and Confidence} = \frac{\text{count}(A \cap B)}{\text{count}(A)},$$

where
- P is defined as a pattern,
- D is defined as a total of the first and second sets of the data, and
- A and B are defined as variables representing data in the first and second sets of the data.

18. The node of claim 13, wherein at least one of the lift, the support and the confidence determine a strength of the relationship between the KQIs in the KQI groups corresponding to the KPIs in the KPI groups.

19. The node of claim 14, wherein the one or more processors further execute instructions to:
 measure frequencies for the second set of the data based on the number of times a pattern occurs in the time interval, and
 process the the number of times the pattern occurs to calculate the predicted pattern frequency for the first set of the data.

20. The node of claim 12, wherein the one or more processors further execute instructions to store the data rules in a storage system accessible by the communications network.

21. The node of claim 12, wherein the association rule learning is implemented using one of an apriori algorithm, eclat algorithm and FP-growth algorithm.

22. The method of claim 14, wherein the one or more processors further execute instructions to identify a quality of service level (QoS) of the one or more network components in the communications network having anomalous behavior based on the predicted KQIs.

23. A method of processing data sets to generate data rules for the data sets in a communications network,
 receiving a first set of the data, identified by monitoring one or more network components in the communications network, including key quality indicators (KQIs) indicative of a quality of service associated, and receiving a second set of the data, identified by monitoring the one or more network components in the communications network, including key performance indicators (KPIs) indicative of a performance level;
 categorizing the first set of data using a first value into one or more KQI groups and the second set of data using a second value into one or more KPI groups, each of the one or more KQI groups and KPI groups identified with a label;
 determining one or more relationships between the KQIs and the KPIs based on pattern frequencies identifying a correlation between the KQIs in the KQI groups and the KPIs in the KPI groups; and
 generating the data rules based on the one or more relationships to predict the KQIs using the KPIs.

24. The method of claim 23, further comprising:
 determining whether each of the data rules satisfy a threshold;
 removing the data rules from the first and second sets of the data that fail to satisfy the threshold;
 ranking the data rules based on metrics including at least one of lift, support and confidence; and
 selecting the data rules according to the ranking.

25. The method of claim 23, further comprising:
 collecting the first set of the data and the second set of the data over a time interval;
 quantizing the collected first set of the data and the second set of the data to define the KQI groups and the KPI groups; and
 predicting the KQIs using the KPIs based on the data.

26. The method of claim 25, further comprising identifying a quality of service (QoS) level of the one or more network components in the communications network having anomalous behavior based on the predicted KQIs.

27. The method of claim 23, wherein the first set of the data including the KQIs is received from a historical database.

* * * * *